(12) United States Patent
Kemmerling et al.

(10) Patent No.: US 11,220,941 B2
(45) Date of Patent: Jan. 11, 2022

(54) METHODS AND SYSTEMS FOR AN AFTERTREATMENT SYSTEM (71) Applicant: Ford Global Technologies, LLC, Dearborn, MI (US)

(72) Inventors: Joerg Kemmerling, Monschau (DE); Christoph Boerensen, Aachen (DE); Frank Wunderlich, Herzogenrath (DE); Michael Forsting, Moenchengladbach (DE); Helmut Matthias Kindl, Aachen (DE); Hanno Friederichs, Aachen (DE); Vanco Smiljanovski, Bedburg (DE); Andreas Kuske, Geulle (NL); Franz Arnd Sommerhoff, Aachen (DE)

(73) Assignee: Ford Global Technologies, LLC, Dearborn, MI (US)

(*) Notice: Subject to any disclaimer, the term of this patent is extended or adjusted under 35 U.S.C. 154(b) by 7 days.

(21) Appl. No.: 16/810,574

(22) Filed: Mar. 5, 2020

(65) Prior Publication Data
US 2020/0284176 A1 Sep. 10, 2020

(30) Foreign Application Priority Data
Mar. 6, 2019 (DE) .......................... 102019203061.0

(51) Int. Cl.
*F01N 3/023* (2006.01)
*F01N 3/029* (2006.01)
*F01N 3/30* (2006.01)
*F01N 3/025* (2006.01)

(52) U.S. Cl.
CPC ......... *F01N 3/0233* (2013.01); *F01N 3/0253* (2013.01); *F01N 3/0296* (2013.01); *F01N 3/306* (2013.01); *F01N 3/0235* (2013.01)

(58) Field of Classification Search
CPC combination set(s) only.
See application file for complete search history.

(56) References Cited

U.S. PATENT DOCUMENTS

| 7,213,396 | B2 | 5/2007 | Ries-Mueller et al. |
| 8,096,111 | B2 | 1/2012 | Hoard et al. |
| 8,468,801 | B2 | 6/2013 | Shimizu et al. |
| (Continued) | | | |

FOREIGN PATENT DOCUMENTS

| DE | 102014223491 A1 | 5/2016 |
| DE | 102017213004 A1 | 1/2019 |
| (Continued) | | |

OTHER PUBLICATIONS

Kim, Y. et al., "Optimization of Purge Air-to-Fuel Ratio Profiles for Enhanced Lean NOx Trap Control," Proceedings of the 2004 American Control Conference, Jun. 30, 2004, Boston, Massachusetts, 6 pages.

*Primary Examiner* — Binh Q Tran
(74) *Attorney, Agent, or Firm* — Geoffrey Brumbaugh; McCoy Russell LLP (57) ABSTRACT Methods and systems are provided for an aftertreatment system. In one example, a method comprises regenerating a $NO_x$ trap during an engine shut-down event. The method further comprises reversing a direction of flow of a gas through a HP-EGR passage during the regenerating.

20 Claims, 5 Drawing Sheets (56) References Cited

U.S. PATENT DOCUMENTS

| | | | |
|---|---|---|---|
| 8,813,490 B2 * | 8/2014 | Wada | F02M 26/15 60/605.2 |
| 8,844,272 B2 * | 9/2014 | Bidner | F02D 41/042 60/295 |
| 8,857,154 B2 | 10/2014 | Mehta | |
| 2010/0236223 A1 | 9/2010 | Ovrebo et al. | |
| 2011/0072797 A1 * | 3/2011 | Van Nieuwstadt | F01N 3/0238 60/285 |
| 2011/0146274 A1 | 6/2011 | Shimizu et al. | |
| 2016/0131006 A1 * | 5/2016 | Kurtz | F01N 3/2066 60/274 |
| 2016/0312721 A1 * | 10/2016 | De Smet | F01N 3/2093 |
| 2017/0022939 A1 * | 1/2017 | Nogi | F02D 41/0007 |
| 2017/0122168 A1 * | 5/2017 | Angst | F01N 3/0842 |
| 2017/0370259 A1 | 12/2017 | Berard et al. | |
| 2019/0120180 A1 * | 4/2019 | Martin | F01N 3/0238 |

FOREIGN PATENT DOCUMENTS

| | | |
|---|---|---|
| JP | 2004308595 A | 11/2004 |
| JP | 3997868 B2 | 10/2007 |

* cited by examiner

//METHODS AND SYSTEMS FOR AN AFTERTREATMENT SYSTEM

CROSS REFERENCE TO RELATED APPLICATIONS

The present application claims priority to German Patent Application No. 102019203061.0, filed on Mar. 6, 2019. The entire contents of the above-listed application is hereby incorporated by reference for all purposes.

FIELD

The present description relates generally to a method for the regeneration of a NOx storage catalytic converter of an exhaust gas aftertreatment device. The invention further relates to a control device for the regeneration of a NOx storage catalytic converter, an exhaust gas aftertreatment device, an engine arrangement, a motor vehicle and a computer program product.

BACKGROUND/SUMMARY

After the combustion gases have left the combustor or the combustion chamber of an internal combustion engine driving the motor vehicle, they are cleaned by mechanical, catalytic or chemical means using exhaust gas aftertreatment devices, so that the statutory pollutant limits are able to be observed.

In the context of increasingly stringent legal requirements for motor vehicle emissions, wide-ranging demands for exhaust gas aftertreatment have arisen as a result. In particular, the emissions generated in connection with a cold start of a diesel engine constitute a challenge in terms of observing future exhaust gas emission standards. A NOx storage catalytic converter may be used for storing the nitrogen oxides produced after a cold start, the NOx storage catalytic converter being arranged upstream of a selective catalytic reduction (SCR) catalyst. Nitrogen oxides are stored via the NOx storage catalytic converter before the SCR catalyst has reached its operating temperature. In this case, however, it is desired that the NOx storage catalytic converter has an available storage capacity in the event of a cold start and is not already full of NOx. As such, a sufficiently large NOx storage catalytic converters may be used, for example in each case the NOx storage catalytic converters already having to be regenerated when charged to 50% to 60% in order to ensure an available storage capacity for a subsequent cold start. The large volume desired and the constructional space demanded thereby for the NOx storage catalytic converter and the high thermal inertia of the NOx storage catalytic converter, resulting in a longer time for heating up, constitute drawbacks. A first drawback is the large amount of constructional space used and a second drawback is in the aforementioned thermal inertia.

At the start of each regeneration process of the NOx storage catalytic converter, initially the oxygen store may be reduced before the stored nitrogen oxides may be reduced to nitrogen. This is disadvantageous, however, regarding carbon dioxide emissions and the risk of an oil dilution. Moreover, the efficiency of a reduction in the stored nitrogen oxides via hydrocarbons (HC) and carbon monoxide (CO) from the fuel is limited by the chemical reaction speed, mass transfer limits, and an uneven flow distribution, so that a CO/HC breakthrough may occur before the stored NOx has been converted.

A method for the regeneration of the intake system by means of an electrically driven turbocharger rotor, after stopping the engine, is disclosed in the document JP 3,997,868 B2. A method for preventing hydrocarbon emissions after a shut-down of an internal combustion engine is disclosed in the document U.S. Pat. No. 7,213,396, wherein an electrical turbocharger is used. A configuration with two supercharger pumps is disclosed in the document JP 2004/308595 A, wherein the flushing of exhaust gas from the engine is improved. A system for heating up a catalytic converter is disclosed in the U.S. Pat. No. 8,468,801 and in the U.S. 2011/0146274 A1. Further exhaust gas aftertreatment apparatuses are disclosed in the documents U.S. 2010/0236223 A1, U.S. 2017/0370259 A1, U.S. Pat. Nos. 8,096,111 B2 and 8,857,154 B2.

The method according to the disclosure for the regeneration of a NOx storage catalytic converter of an exhaust gas aftertreatment device of an internal combustion engine arrangement relates to an internal combustion engine arrangement which comprises an internal combustion engine, an electrically driven supercharger, a high pressure exhaust gas recirculation flow channel, a low pressure exhaust gas recirculation flow channel with an inlet downstream of the exhaust gas aftertreatment device and an exhaust gas valve which is arranged downstream of the inlet of the low pressure exhaust gas recirculation flow channel.

The method according to the disclosure may comprise a shut-down of the internal combustion engine is detected. The charging of the NOx storage catalytic converter is determined. The charging is determined, for example, by means of models in the engine control unit, the charging is thus calculated continuously and the value may be available when the engine is turned off. The current operating temperature of the exhaust gas aftertreatment device is determined, for example, on a fixed component of the exhaust gas aftertreatment device.

The disclosed method according to the disclosure has the advantage that a regeneration of the NOx storage catalytic converter may also be carried out when the internal combustion engine is not in operation, i.e. in particular after a shut down of the internal combustion engine. A further advantage is that the storage capacity of the NOx storage catalytic converter may be fully utilized. In this case, the NOx storage catalytic converter may be dimensioned, for example, such that its storage capacity is optimized relative to a storage capacity desired during a cold start. Thus the NOx storage catalytic converter may be configured as small as possible and its thermal inertia reduced at the same time.

Moreover, an oil dilution by fuel, as may occur in the case of a post-injection in the cylinder, is prevented. Furthermore, with the application of the method according to the disclosure after a shut down of the internal combustion engine the NOx storage catalytic converter is always prepared for a subsequent cold start. Furthermore, an additional air supply and/or corresponding air supply systems are not required in order to supply, in particular, preheated air upstream of the NOx storage catalytic converter. Further advantages are that the regeneration may also take place during the stop phases within the context of a start/stop function, the regeneration process being improved regarding the chemical reaction efficiency, the fuel consumption and the exhaust gas mass flow. For example, the detection of a shut down of the internal combustion engine may encompass a final shut down for terminating a journey or a shut down within the context of an automatic start-stop system and/or start-stop function.

In an advantageous variant, the low pressure exhaust gas recirculation flow channel comprises a low pressure exhaust gas recirculation valve which is opened before the regeneration of the NOx storage catalytic converter. Additionally or alternatively, the high pressure exhaust gas recirculation flow channel may comprise a high pressure exhaust gas recirculation valve which is opened before the regeneration of the NOx storage catalytic converter. In particular, the high pressure exhaust gas recirculation flow channel may have a flow direction which is fixed for the exhaust gas recirculation and the mixture of fresh air and recirculated exhaust gas may be conducted in a direction opposing this flow direction through the high pressure exhaust gas recirculation flow channel to the NOx storage catalytic converter. In this manner, flow channels which are present are optimally used for an efficient regeneration of the NOx storage catalytic converter.

The use of the exhaust gas recirculation flow channels for feeding in fresh air upstream of the NOx storage catalytic converter in the context of the regeneration thereof has the advantage that no additional flow channels have to be provided for a regeneration of the NOx storage catalytic converter. Thus constructional space is saved and the complexity and susceptibility to malfunction of the arrangement are reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
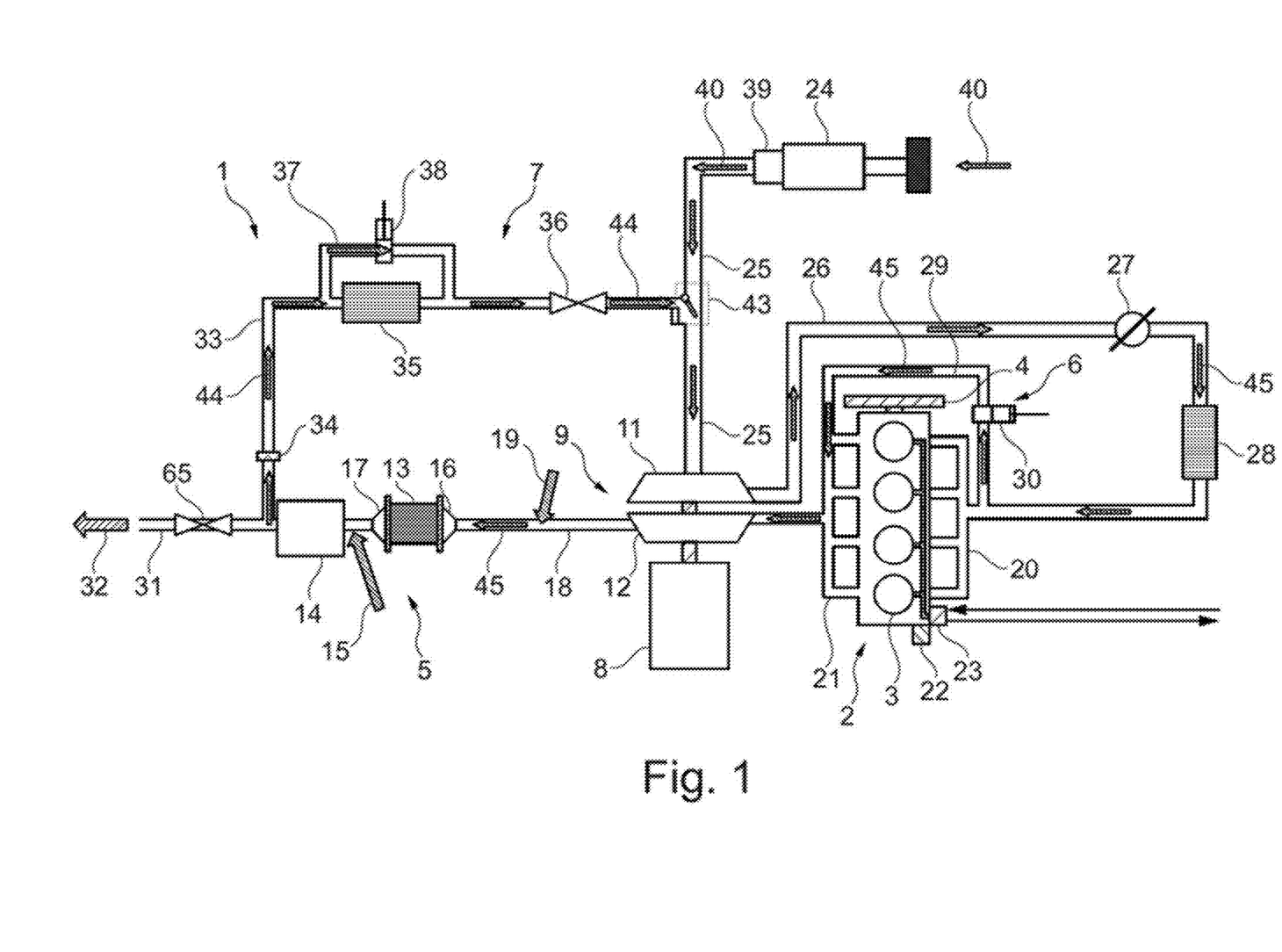
FIG. 1 shows schematically an engine arrangement according to the disclosure.
Figure 2:
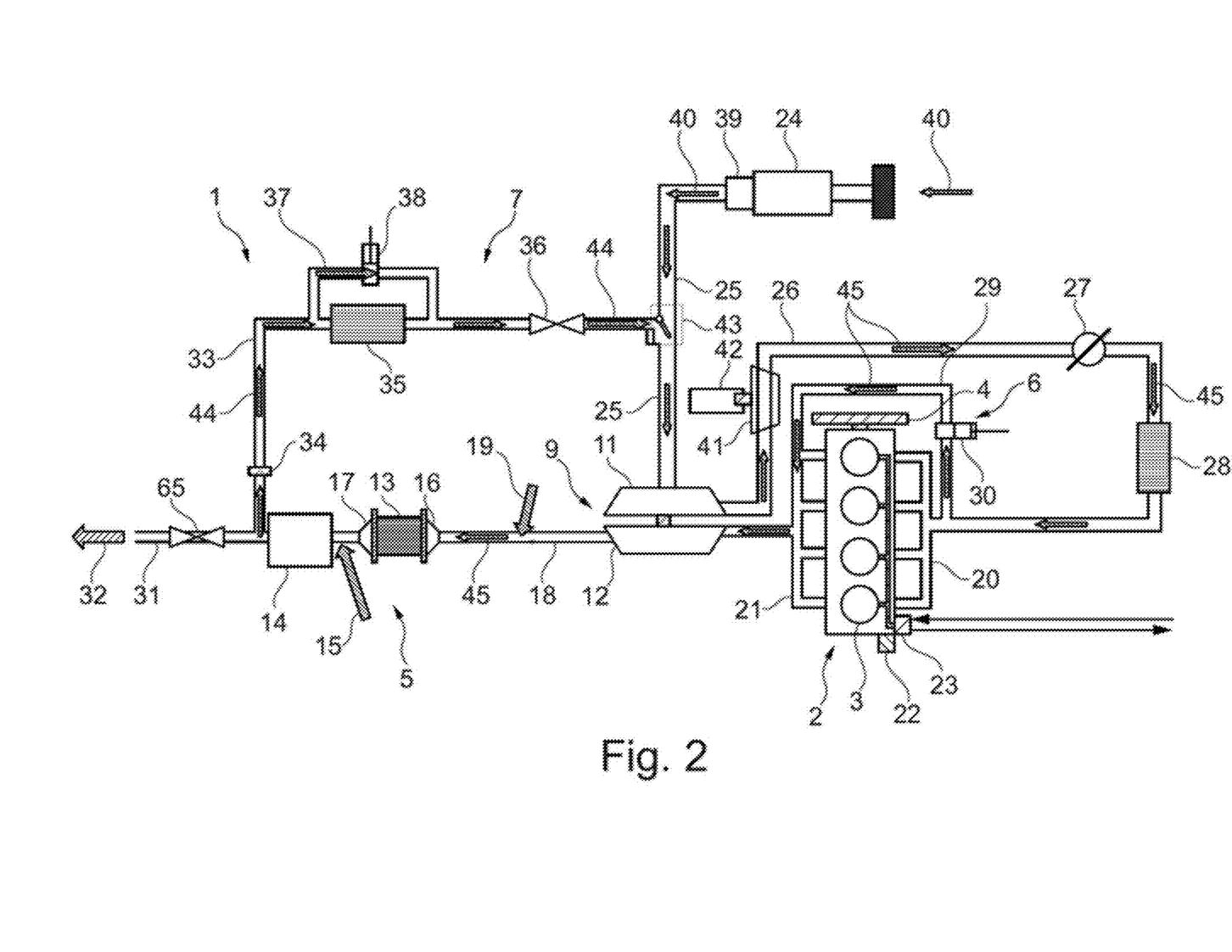
FIG. 2 shows schematically a further variant of an engine arrangement according to the disclosure.
Figure 3:
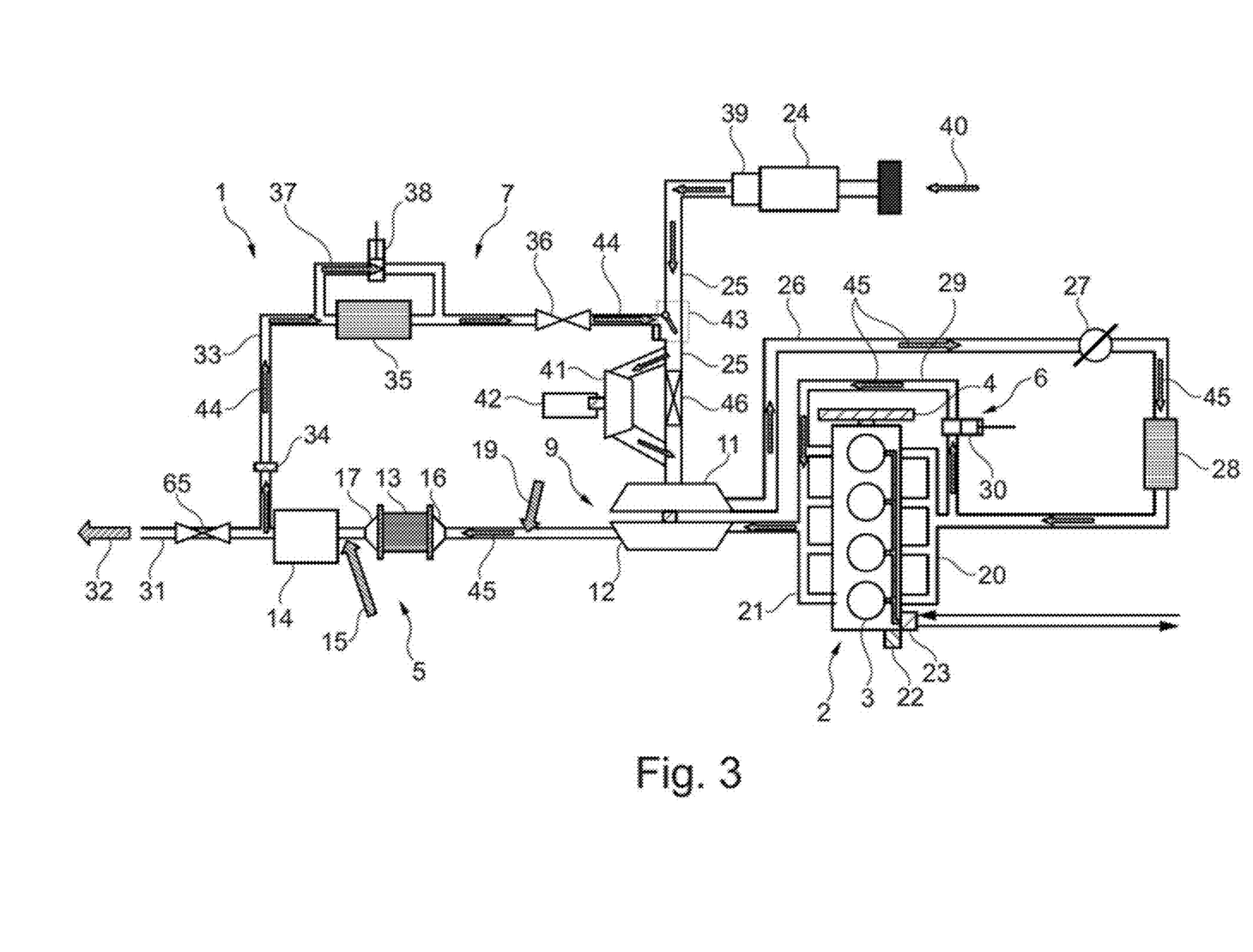
FIG. 3 shows schematically an additional embodiment of the engine arrangement according to the disclosure.
Figure 4:
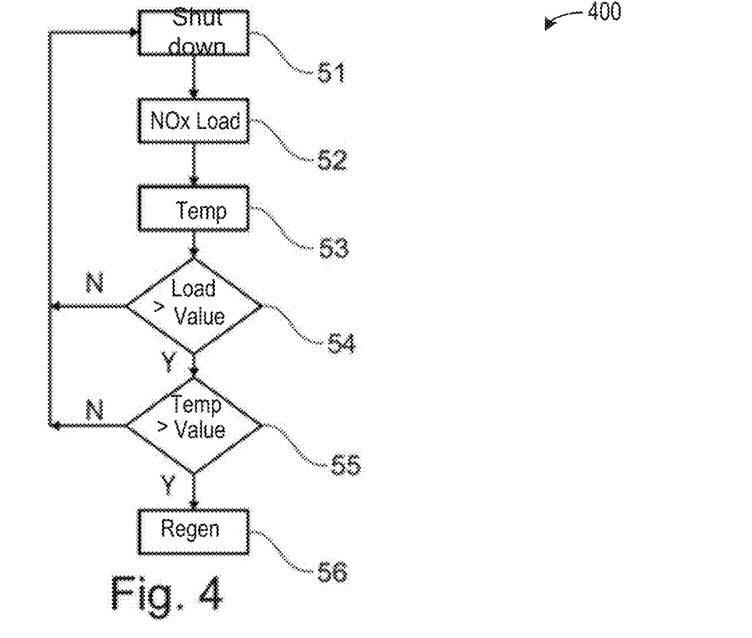
FIG. 4 shows a method according to the disclosure in the form of a flow diagram.
Figure 5:
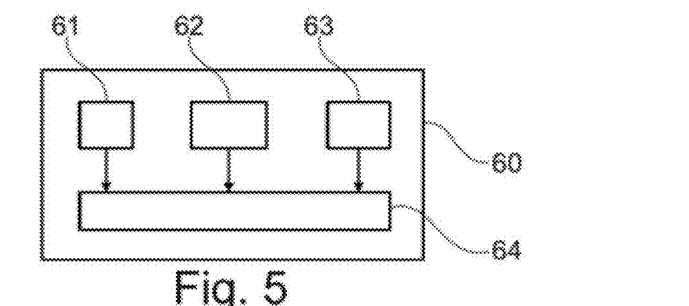
FIG. 5 shows schematically a control device according to the disclosure.
Figure 6:
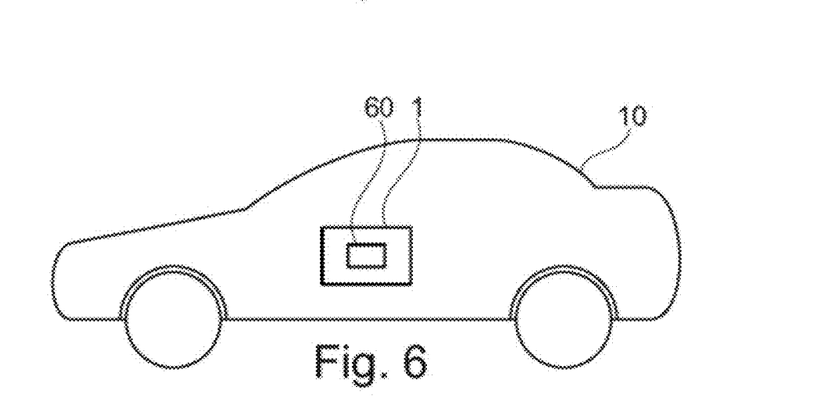
FIG. 6 shows schematically a motor vehicle according to the disclosure.
Figure 7:
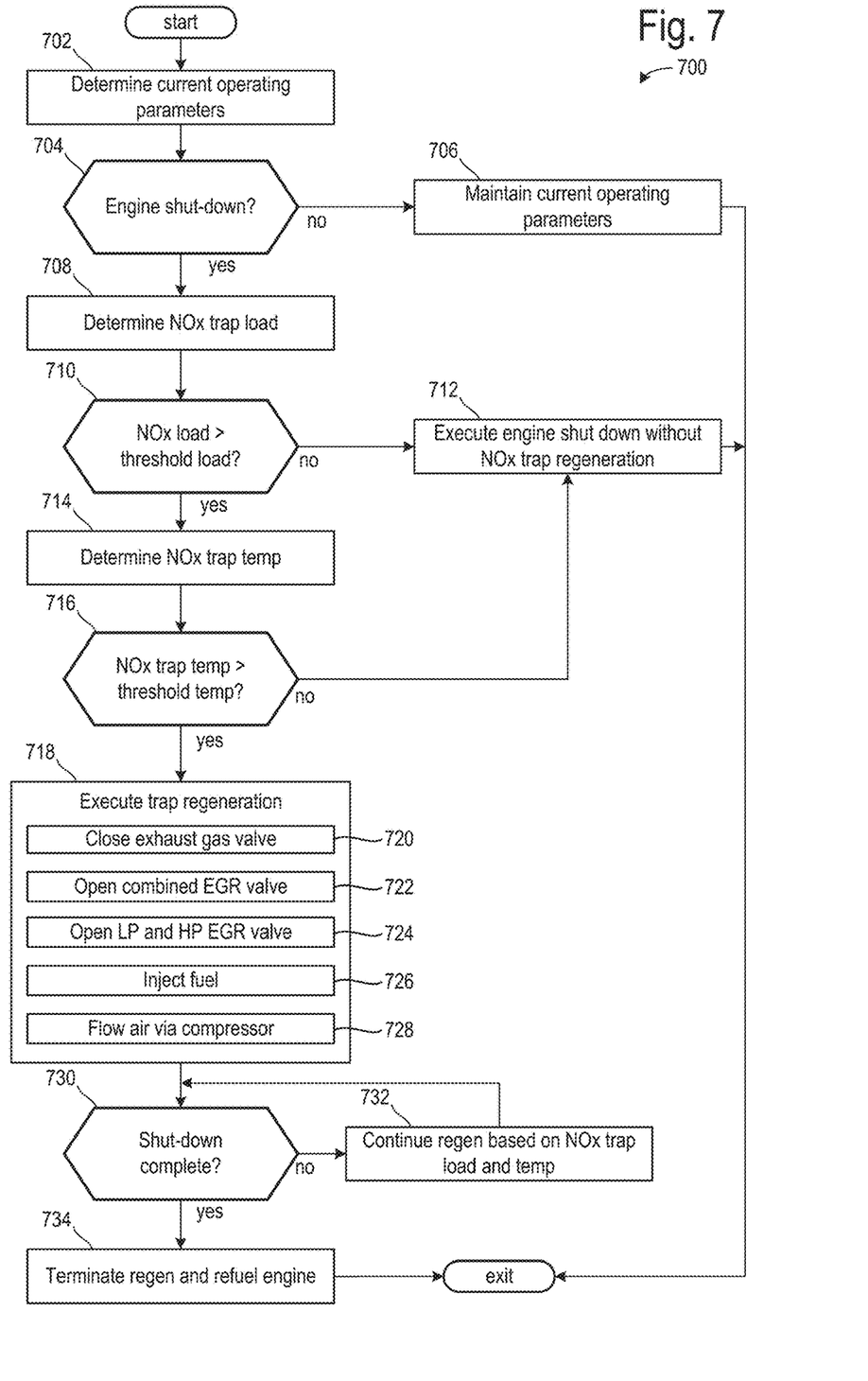
FIG. 7 shows a method for regenerating an aftertreatment device during a shut down.

The following description relates to systems and methods for an aftertreatment device. FIG. 1 shows schematically an engine arrangement according to the disclosure. FIG. 2 shows schematically a further variant of an engine arrangement according to the disclosure. FIG. 3 shows schematically a further variant of an engine arrangement according to the disclosure FIG. 4 shows schematically a method according to the disclosure in the form of a flow diagram. FIG. 5 shows schematically a control device according to the disclosure. FIG. 6 shows schematically a motor vehicle according to the disclosure. FIG. 7 shows a method for regenerating an aftertreatment device during a shut down.

If the determined charging of the NOx storage catalytic converter exceeds a fixed threshold value and the determined current operating temperature exceeds a fixed threshold value, the NOx storage catalytic converter is regenerated after the shut down of the internal combustion engine. In this case, the exhaust gas valve is closed and exhaust gas is conducted through the low pressure exhaust gas recirculation flow channel, and fresh air and exhaust gas recirculated via the low pressure exhaust gas recirculation flow channel are conducted via the electrically driven supercharger through the high pressure exhaust gas recirculation flow channel to the NOx storage catalytic converter, in particular to the inlet of the NOx storage catalytic converter. In this case, the fresh air is heated up and upstream of the NOx storage catalytic converter and mixed with vaporized fuel to form a rich air-fuel mixture.

In a particularly advantageous variant, the mixture of fresh air and recirculated exhaust gas is heated via an electrical heater. The electrical heater may be a component of the NOx storage catalytic converter or designed as an electrically heated catalytic converter (E-cat). Additionally or alternatively, the mixture of fresh air and recirculated exhaust gas may be heated via the exhaust gas aftertreatment device and/or the internal combustion engine. The aforementioned variants have the advantage that no additional devices are required for heating the mixture of fresh air and recirculated exhaust gas and the residual heat present in the exhaust gas aftertreatment device is optimally used for reaching the temperature required for the regeneration. The mixture may be heated, for example, by heat discharged from the internal combustion engine, for example radiated heat. To this end, the mixture may be conducted, for example, through an exhaust gas recirculation flow channel in the vicinity of the cylinder head and/or the engine block or through exhaust gas recirculation flow channels integrated in the cylinder head and/or in the engine block. In this case, the internal combustion engine comprises a cylinder head and an engine block.

The mixing ratio of the mixture of fresh air and recirculated exhaust gas is preferably controlled. For controlling the mixing ratio, the mixing ratio may be determined via a lambda sensor arranged upstream of the NOx storage catalytic converter and/or a lambda sensor arranged downstream of the NOx storage catalytic converter. A mass air flow sensor may also be used. The regeneration may be optimized by controlling the mixing ratio.

In a further variant, during the regeneration, nitrogen oxide may be released from the NOx storage catalytic converter, i.e. conducted out through an outlet of the NOx storage catalytic converter and conducted onward to an SCR catalyst. The nitrogen oxide is then bound by ammonia (NH3) still stored in the SCR catalyst. In this manner, the regeneration process of the NOx storage catalytic converter may be accelerated.

For example, the quantity of nitrogen oxide released from the NOx storage catalytic converter may be detected via a NOx sensor arranged downstream of the NOx storage catalytic converter and when a fixed nitrogen oxide threshold value is exceeded, carbamide and/or urea may be injected downstream of the NOx storage catalytic converter and upstream of the SCR catalyst. The injection may take place, in particular, when the internal combustion engine is switched off and permits a complete reduction of the nitrogen oxides via the SCR catalyst as long as the temperature of the SCR catalyst is still sufficiently high or may be obtained, for example, by an electrical heating element.

The computer program product according to the disclosure comprises commands which, during the execution of the program by a computer, prompt said computer to execute an above-described method according to the disclosure. The computer program product according to the disclosure has the aforementioned advantages in combination with the method according to the disclosure.

The control device according to the disclosure for the regeneration of a NOx storage catalytic converter is characterized in that the control device comprises an apparatus for detecting a shut down of the internal combustion engine, an apparatus for determining the charging of the NOx storage catalytic converter and an apparatus for determining the current operating temperature of the exhaust gas aftertreatment device and is designed to execute an above-described method according to the disclosure. The control device according to the disclosure has the aforementioned features and advantages in combination with the method according to the disclosure.

The apparatus for determining the current operating temperature of the exhaust gas aftertreatment device may comprise a temperature sensor. For example, the apparatus for determining the current operating temperature of the exhaust gas aftertreatment device may be arranged on a fixed component of the exhaust gas aftertreatment device, in particular on a component arranged upstream or downstream of the $NO_x$ storage catalytic converter. By determining and/or detecting the current operating temperature of the exhaust gas aftertreatment device and taking this into account in connection with the initiation of a regeneration process of the $NO_x$ storage catalytic converter it is ensured that the temperature of the supplied mixture of fresh air and exhaust gas, which is required for a regeneration of the $NO_x$ storage catalytic converter, is present during the regeneration process.

The exhaust gas aftertreatment device according to the disclosure comprises a $NO_x$ storage catalytic converter, an electrically driven supercharger, for example an electrically driven compressor or turbocharger. Preferably the electrically driven supercharger is a supercharger which is otherwise present for charging the internal combustion engine. The exhaust gas aftertreatment device according to the disclosure additionally comprises a high pressure exhaust gas recirculation flow channel, a low pressure exhaust gas recirculation flow channel with an inlet downstream of the exhaust gas aftertreatment device and an exhaust gas valve which is arranged downstream of the inlet of the low pressure exhaust gas recirculation flow channel. The exhaust gas aftertreatment device according to the disclosure further comprises an above-described control device according to the disclosure. Additionally or alternatively, the exhaust gas aftertreatment device according to the disclosure is designed to execute an above-described method according to the disclosure. The exhaust gas aftertreatment device according to the disclosure has the aforementioned features and advantages.

The $NO_x$ storage catalytic converter comprises an inlet. Advantageously a device is arranged upstream of the $NO_x$ storage catalytic converter for vaporizing and/or injecting fuel into a flow channel leading to the inlet of the $NO_x$ storage catalytic converter. The device for vaporizing and/or injecting fuel may be designed, in particular, to inject fuel in vaporized form and to mix said fuel with the supplied mixture of fresh air and exhaust gas.

In a further advantageous variant, the electrically driven supercharger is configured as an electrical turbocharger or electrically driven compressor. The described use of the electrically driven supercharger has the advantage that after a shut down of the internal combustion engine, fresh air and exhaust gas may be conducted through otherwise present exhaust gas recirculation channels for the regeneration of the $NO_x$ storage catalytic converter in an efficient manner.

Advantageously, an SCR catalyst and/or a particle filter with an SCR coating is arranged downstream of the $NO_x$ storage catalytic converter, wherein a urea injection device may be arranged upstream thereof. Additionally or alternatively, a lambda sensor may be arranged upstream and/or a lambda sensor may be arranged downstream of the $NO_x$ storage catalytic converter and/or a mass air flow sensor may be present. Moreover, an electrically heated catalytic converter (E-cat) may be present for heating up and/or heating the $NO_x$ storage catalytic converter or the $NO_x$ storage catalytic converter may be configured as an electrically heated catalytic converter (E-cat).

The engine arrangement according to the disclosure comprises an internal combustion engine and an exhaust gas aftertreatment device according to the disclosure described above. The motor vehicle according to the disclosure comprises an engine arrangement according to the disclosure. The engine arrangement according to the disclosure and the motor vehicle according to the disclosure have the aforementioned advantages. Said engine arrangement permits, in particular, a regeneration of the $NO_x$ storage catalytic converter even after a shut down of the internal combustion engine and thus ensures optimal conditions for a subsequent cold start of the internal combustion engine, in terms of a reduction in the nitrogen oxide emissions in the context of a cold start. The motor vehicle according to the disclosure may be a motorcycle, a passenger motor vehicle, a truck, a bus or minibus.

FIGS. 1-3 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

The engine arrangement 1 shown schematically in FIG. 1 comprises an internal combustion engine 2, an exhaust gas aftertreatment device 5, a high pressure exhaust gas recirculation device 6, and a low pressure exhaust gas recirculation device 7. Moreover, the engine arrangement 1 comprises a turbocharger 9 driven via an electric motor 8. The electric motor 8 may also be configured as a generator at the same time. The turbocharger 9 comprises a compressor 11 and a turbine 12.

The exhaust gas aftertreatment device 5 comprises a $NO_x$ storage catalytic converter 13 and a particle filter arranged downstream of the $NO_x$ storage catalytic converter 13 with an optional SCR coating 14. The $NO_x$ storage catalytic converter 13 comprises an inlet 16 and an outlet 17. A device 19 for vaporizing or injecting fuel into the flow channel 18 leading to the $NO_x$ storage catalytic converter 13 is arranged directly upstream of the inlet 16 of the $NO_x$ storage catalytic converter 13. A device 15 for injecting a reductant to the SCR coated PF 14 is arranged directly upstream of an inlet of the SCR coated PF 14.

An exhaust gas valve 65 is arranged downstream of the exhaust gas aftertreatment device 5 and downstream of the low pressure exhaust gas recirculation device 7.

The internal combustion engine 2 comprises a number of cylinders 3, in the variant shown four cylinders, a flywheel 4, an inlet manifold 20, and an exhaust gas manifold 21. Moreover, an oil cooler 22 and a high pressure fuel pump 23 are arranged in the internal combustion engine 2.

During the operation of the internal combustion engine 2, the cylinders 3 are supplied with fuel via the fuel pump 23. Moreover, charge air is suctioned through an air filter 24 via the compressor 11. In the variant shown, the air filter 24 comprises a mass air flow sensor 39. The flow channel leading from the air filter 24 to the compressor 11 is denoted by the reference numeral 25. The charge air compressed by the compressor 11 and/or the exhaust gas mixed with the charge air in the case of an exhaust gas recirculation is conducted through a flow channel 26 to a throttle 27 and onward through a charge air cooler 28 to the inlet manifold 21 and to the cylinders 3.

In the variant shown, a high pressure exhaust gas recirculation flow channel 29 which branches off from the exhaust gas manifold 21 is present, and directly upstream of the inlet manifold 20 discharges therein. The flow channel 29 additionally comprises a high pressure exhaust gas recirculation valve 30.

The exhaust gas leaving the internal combustion engine 2 is conducted via the exhaust gas manifold 21 to the turbine 12, whereby the compressor 11 is driven. Subsequently, the exhaust gas is conducted through the flow channel 18 to the aforementioned exhaust gas aftertreatment components. After passing through the exhaust gas aftertreatment device 5, the cleaned exhaust gas is conducted through the exhaust gas valve 65 to the outlet 31. The flow direction of the exhaust gas is denoted by the reference numeral 32.

A low pressure exhaust gas recirculation flow channel 33 is arranged upstream of the outlet 31. This low pressure exhaust gas recirculation flow channel 33 comprises an impurity filter 34 and a cooler 35 and a valve 36. In the variant shown, the exhaust gas recirculation cooler 35 is bridged by a bypass flow channel 37 with a low pressure exhaust gas recirculation bypass valve 38. The low pressure exhaust gas recirculation channel 33 is additionally connected to the flow channel 25 via a combined exhaust gas recirculation valve 43. During the application of the method according to the disclosure the exhaust gas valve 65 is closed and the combined exhaust gas recirculation valve 43, the low pressure exhaust gas recirculation bypass valve 38, the valve 36, and the high pressure exhaust gas recirculation valve 30 are opened. The flow direction of the exhaust gas recirculated through the low pressure exhaust gas recirculation flow channel 33 is denoted by the reference numeral 44.

The operation of the engine arrangement 1 shown according to the method according to the disclosure is described hereinafter with respect to FIG. 4. In this case, initially a shut down of the internal combustion engine 2 is detected. The charging of the $NO_x$ storage catalytic converter 13 is known by the continuous model-based determination. Moreover, the current operating temperature of the exhaust gas aftertreatment device, in particular of the $NO_x$ storage catalytic converter 13, is determined. A sensor which is otherwise present may be used. Generally, the gas temperature is measured downstream of the $NO_x$ storage catalytic converter 13 and/or upstream of an SCR catalyst, for example of the particle filter with the SCR coating 14, in order to ensure the function of the SCR catalyst. This variable may optionally be used together with the operating time in order to determine, in particular to model, the component temperature of the $NO_x$ storage catalytic converter 13. The temperature in the interior of the $NO_x$ storage catalytic converter 13 is continuously determined, for example, by a model which calculates this temperature based on the mass flows, the temperature upstream and downstream of the $NO_x$ storage catalytic converter 13 and the chemical composition of the exhaust gas. In this case, chemical reactions which release heat and may increase the temperature in the interior are also considered.

If the charging (e.g., load) of the $NO_x$ storage catalytic converter 13 exceeds a fixed threshold value and the determined current operating temperature exceeds a fixed threshold value, the $NO_x$ storage catalytic converter 13 is regenerated after the shut down of the internal combustion engine 2. To this end, the exhaust gas valve 65 is closed. Exhaust gas is conducted via the low pressure exhaust gas recirculation flow channel 33 to the flow channel 25. The turbocharger 9 is operated via the electric motor 8 and at the same time fresh air is suctioned, said fresh air being mixed with the recirculated exhaust gas. The flow direction of the suctioned fresh air is denoted by arrows with the reference numeral 40. The flow direction of the exhaust gas-air mixture is denoted by arrows with the reference numeral 45.

The mixture of fresh air suctioned via the compressor 11 and recirculated exhaust gas then passes through the exhaust gas recirculation flow channel 26 and, when the high pressure exhaust gas recirculation valve 30 is opened, is then conducted past the internal combustion engine 2 via the high pressure exhaust gas recirculation flow channel 29. In the high pressure exhaust gas recirculation flow channel 29 the flow direction 45 runs in the opposing direction to the flow direction of the exhaust gas in the event of exhaust gas recirculation during the operation of the internal combustion engine. In this case, the suctioned mixture is heated by heat discharged from the flow channel 26 and the high pressure exhaust gas recirculation flow channel 29, in particular heat discharged from the cylinders 3, i.e. the cylinder head and/or the cylinder block.

The heated mixture reaches the inlet 16 of the $NO_x$ storage catalytic converter 13 via the flow channel 18. Upstream of the inlet 16 of the $NO_x$ storage catalytic converter 13, via the device for vaporizing and injecting fuel 19, fuel is supplied to the suctioned mixture and mixed therewith. In this case a rich air-fuel mixture is produced and the NO$_x$ storage catalytic converter 13 is regenerated. In this method, the suctioned air flows through the high pressure exhaust gas recirculation flow channel 29 in an opposing flow direction relative to the application in the context of the high pressure exhaust gas recirculation. As a result, additional flow channels for a regeneration of the NO$_x$ storage catalytic converter 13 are not needed after the internal combustion engine 2 is shut down. Even after a shut down of the internal combustion engine 2, the exhaust gas-air mixture may be suctioned via the turbocharger 9 operated via the electric motor 8 and conducted to the NO$_x$ storage catalytic converter 13.

In the variant shown in FIG. 2, in contrast to the variant shown in FIG. 1, a turbocharger without an electrical drive is provided. Additionally, a further compressor 41 is provided downstream of the compressor 11 of the turbocharger 9, said further compressor being operated by an electric motor 42. In the variant shown in FIG. 3, in contrast to the variant shown in FIG. 2, the flow channel 25 downstream of the combined exhaust gas recirculation valve 43 and upstream of the turbocharger 9 is fitted with a valve 46 and a bypass flow channel which bridges the valve 46 and which comprises the compressor 41 operated by an electric motor 42.

Within the context of the application of the method according to the disclosure, by means of one of the configurations shown in FIGS. 2 and 3 the electrically driven compressor 41 is used for suctioning the exhaust gas-air mixture after a shut down of the internal combustion engine 2. In the variant shown in FIG. 3, at the same time the valve 46 is closed. Moreover, the mode of operation corresponds to the mode of operation described in connection with FIG. 1. The electrically driven compressor 41 may also be arranged at a different appropriate position.

FIG. 4 shows schematically a method 400 according to the disclosure in the form of a flow diagram. In a first step 51 a shut down of the internal combustion engine 2 is detected. If the internal combustion engine 2 is shut down, in step 52 the charging of the NO$_x$ storage catalytic converter 13 is determined. In step 53 the current operating temperature of the NO$_x$ storage catalytic converter 13 or of a different exhaust gas aftertreatment component is determined. The steps 52 and 53 may also be executed at the same time or in reverse sequence.

In step 54 it is monitored whether the determined charging of the NO$_x$ storage catalytic converter 13 exceeds a fixed threshold value. If this is the case, the method is continued with step 55. If this is not the case, the method returns to step 51. In step 55 it is determined whether the determined current operating temperature of the NO$_x$ storage catalytic converter 13 exceeds a fixed threshold value. Steps 54 and 55 may also be carried out at the same time or in reverse sequence.

If the determined current operating temperature does not exceed the fixed threshold value, the method returns to step 51. If the current operating temperature exceeds the fixed threshold value, in step 56 the NO$_x$ storage catalytic converter 13 is regenerated and/or flushed, wherein the exhaust gas valve 65 is closed by means of the electrically driven supercharger 9 or 41, for example as described in connection with FIGS. 1 to 3, exhaust gas which is recirculated via the low pressure exhaust gas recirculation flow channel 33 and fresh air are conducted to the NO$_x$ storage catalytic converter 13, heated up at the same time, and upstream of the NO$_x$ storage catalytic converter 13, preferably directly upstream of the inlet 16 of the NO$_x$ storage catalytic converter 13, mixed with vaporized fuel to form a rich air-fuel mixture.

FIG. 5 shows schematically a control device 60 according to the disclosure. The control device 60 comprises an apparatus 61 for determining the charging of the NO$_x$ storage catalytic converter 13, an apparatus 62 for determining the current operating temperature of the NO$_x$ storage catalytic converter 13, for example a temperature sensor, an apparatus 63 for detecting a shut down of the internal combustion engine 2 and an evaluation apparatus 64. The cited apparatuses 61, 62 and 63 are designed to transmit signals to the evaluation apparatus 64. The control device 60 is designed to execute a method according to the disclosure, for example a method described in connection with FIG. 4. In one example, the control device 60 comprises memory on which instructions are stored. The instructions, which are computer-readable, when executed, may enable the control device 60 to execute the method 400 of FIG. 4.

FIG. 6 shows schematically a motor vehicle 10 according to the disclosure. The motor vehicle 10 according to the disclosure comprises an engine arrangement 1 according to the disclosure, for example an engine arrangement 1 described with reference to FIGS. 1 to 3. Additionally, the motor vehicle 10 or the engine arrangement 1 may comprise a control device 60 according to the disclosure. The engine arrangement 1 according to the disclosure is configured to execute a method according to the disclosure, for example a method according to the disclosure described in connection with the engine arrangement in FIG. 4.

Turning now to FIG. 7, it shows a method 700 for executing the regeneration of a NO$_x$ trap (e.g., NO$_x$ storage catalytic converter 13 of FIGS. 1, 2, and 3). Instructions for carrying out method 700 and the method 400 above may be executed by a control device based on instructions stored on a memory of the a control device and in conjunction with signals received from sensors of the engine system, such as the sensors described above with reference to FIGS. 1 and 5. The control device may employ engine actuators of the engine system to adjust engine operation, according to the methods described below.

The method 700 begins at 702, which includes determining if current engine operating parameters. Current engine operating parameters may include but are not limited to one or more of a throttle position, manifold vacuum, accelerator pedal position, engine temperature, engine speed, and an air/fuel ratio.

The method 700 proceeds to 704, which includes determining if an engine shut-down is occurring. An engine shut-down is occurring if the engine is unfueled and the accelerator pedal is not being depressed. In one example, the engine shut-down event comprises a start/stop, a coasting event, or other similar event.

If the engine shut-down is not occurring, then the method 700 proceeds to 706 to maintain current operating parameters and does not regenerate the lean NO$_x$ trap. As such, the engine is fueled and a direction of gas flow through the HP-EGR passage is not reversed.

If the engine shut-down is occurring, then the method 700 proceeds to 708, which includes determining a NO$_x$ trap load. The NO$_x$ trap load may be estimated based on a data stored in a multi-input look-up table, wherein inputs may include regeneration frequency, regeneration duration, cold-start duration, and the like. Additionally or alternatively, the NO$_x$ trap load may be estimated via a model monitoring NO$_x$ production and NO$_x$ trap regeneration in combination with conditions configured for the NO$_x$ trap to capture and store NO$_x$.

The method 700 proceeds to 710 to determine if the NO$_x$ load is greater than a threshold load. In one example, the threshold load is a fixed value, such as 70-80% saturation of the $NO_x$ trap with $NO_x$. Alternatively, the threshold load may be a dynamic value based on an estimated $NO_x$ production during an engine cold-start. Thus, the threshold load may be increase in response to an estimated $NO_x$ production during a next cold-start being high.

If the $NO_x$ load is not greater than the threshold load, then the method 700 proceeds to 712, which includes executing the engine shut-down with a $NO_x$ trap regeneration. That is to say, the regeneration may not be executed due to the $NO_x$ trap load not being greater than the threshold load, resulting in the $NO_x$ trap already being conditioned to capture a desired amount of $NO_x$ during a subsequent engine start without the regeneration. As such, an economy of the engine shut-down may be increased.

In some examples, additionally or alternatively, a regeneration of the $NO_x$ trap may be executed despite the $NO_x$ trap load being less than or equal to the threshold load. In such examples, the $NO_x$ trap is regenerated prophylactically to ensure it has sufficient space to capture $NO_x$ during a subsequent engine cold-start or during another engine condition where $NO_x$ may be produced. In some examples, a duration of the regeneration in response to the $NO_x$ trap load being less than or equal to the threshold load may be shorter than the regeneration when the $NO_x$ trap load is greater than the threshold load. In one example, the regeneration is a partial regeneration when the $NO_x$ trap load is less than or equal to the threshold load.

If the $NO_x$ load is greater than the threshold load, then the method 700 proceeds to 714 to determine a $NO_x$ trap temperature. The $NO_x$ trap temperature may be determined directly via feedback from a temperature sensor and/or estimated via a temperature model based on exhaust gas temperatures sensed at various points in an exhaust passage.

The method 700 proceeds to 716, which includes determining if the $NO_x$ trap temperature is greater than a threshold regeneration temperature. The threshold regeneration temperature may be based on a temperature where the $NO_x$ trap may release $NO_x$ stored thereon. As one example, the threshold regeneration temperature is a temperature between 200 and 400° C.

If the threshold regeneration temperature is not met (e.g., the $NO_x$ trap temperature is not greater than the threshold regeneration temperature), then the method 700 proceeds to 712 as described above.

If the threshold regeneration temperature is met and the $NO_x$ trap temperature is greater than the threshold regeneration temperature, then the method 700 proceeds to 718, which includes executing the trap regeneration. Executing the trap regeneration during the engine shut-down may include one or more of closing an exhaust gas valve (such as exhaust gas valve 65 of FIG. 1) at 720, opening a combined EGR valve (e.g., such as combined exhaust gas recirculation valve 43 of FIG. 1) at 722, opening a low-pressure EGR valve (e.g., such as valve 36 of FIG. 1) and a high-pressure EGR valve (e.g., such high pressure exhaust gas recirculation valve 30 of FIG. 1) at 724, injecting fuel (e.g., via injector 19 of FIG. 1) at 726, and flowing air via a compressor 728. As described above, the compressor may be a compressor included in a turbocharger, such as compressor 11 of FIG. 1, or a second additional compressor configured to promote air flow during the shut-down, such as compressor 41 of FIGS. 2 and 3. At any rate, the compressor may be driven by an electric motor such that exhaust gas is not needed to drive the turbine and ultimately drive the compressor. As such, gas may flow through the $NO_x$ trap, and into the low-pressure exhaust gas recirculation pathway without flowing out the tailpipe. The gas may be routed around a cooler via a bypass valve being moved to an open position. By doing this, a temperature of the $NO_x$ trap may be maintained during the shut-down. The gas may mix with air as the compressor draws air into the intake passage and flow through the high pressure exhaust gas recirculation passage and into the exhaust passage toward the $NO_x$ trap. That is to say, gas flow through the high pressure exhaust gas recirculation passage flows in a first direction during an engine shut-down and in a second direction, opposite the first direction, when the engine is fueled and active.

The method 700 proceeds to 730 to determine if the shut-down is complete. The shut-down is complete when the engine is refueled (e.g., in response to an accelerator pedal tip-in). IF the shut-down is not complete, then the method 700 proceeds to 732 to continue the regeneration based on the $NO_x$ trap load and temperature. Once either the load or the temperature of the $NO_x$ trap falls below a respective threshold, the regeneration may be terminated during the shut-down and the shut-down may proceed without the regeneration being executed. Terminating the regeneration may include deactivating the compressor and opening the exhaust gas valve. As such, gases may flow through the tailpipe.

If the shut-down is complete then the regeneration may be terminated and the engine refueled.

As described above, the regeneration of the $NO_x$ trap may be adjusted in response to a reductant load of the SCR coated PF. In one example, following a threshold amount of $NO_x$ released from the $NO_x$ trap, it may be assumed that the SCR coated PF is depleted of reductant. As such, an injector, such as urea injector 19 of FIG. 1, may inject reductant to allow $NO_x$ to be reduced during the engine shut-down as the $NO_x$ trap is regenerated.

In this way, a $NO_x$ trap may be regenerated during an engine shut-down event where ample air is supplied. This may be executed via an electrically driven compressor, which is intrusively activated during the shut-down event to draw air into the intake passage. The technical effect of activating the electric compressor to draw air is to ensure adequate air flow during the shut-down. Furthermore, the air flows through passages proximal to the engine, such that latent heat from the engine may be transferred to the $NO_x$ trap without cooling the engine. As such, a regeneration temperature of the $NO_x$ trap may be maintained during the shut-down.

In one embodiment, a method for regenerating a NOx storage catalytic converter of an exhaust gas aftertreatment device of an internal combustion engine arrangement comprising an internal combustion engine, an electrically driven supercharger, a high pressure exhaust gas recirculation flow channel, a low pressure exhaust gas recirculation flow channel with an inlet downstream of the NOx storage catalytic converter, and an exhaust gas valve arranged downstream of the inlet of the low pressure exhaust gas recirculation flow channel, wherein the regenerating comprises detecting a shut-down of the internal combustion engine, determining a load of the NOx storage catalytic converter, determining a current operating temperature of the NOx storage catalytic converter, regenerating the NOx storage catalytic converter in response to the load exceeding a threshold load and the current operating temperature exceeding a threshold temperature, wherein the regenerating comprises a mixture of air and recirculated exhaust gas being conducted via the electrically driven supercharger, wherein the regenerating comprises closing the exhaust gas valve.

A first example of the method further includes where flowing exhaust gas and fresh air through the low pressure exhaust gas recirculation flow channel, wherein the low pressure exhaust gas recirculation flow channel comprises a low pressure exhaust gas recirculation valve, wherein the low pressure exhaust gas recirculation valve is opened before the regenerating of the NOx storage catalytic converter, further comprising flowing the fresh air and the exhaust gas through the high pressure exhaust gas recirculation flow channel, wherein the high pressure exhaust gas recirculation flow channel comprises a high pressure exhaust gas recirculation valve, wherein the high pressure exhaust gas recirculation valve is opened before the regeneration of the NOx storage catalytic converter.

A second example of the method, optionally including the first example, further includes where flowing the mixture of fresh air and exhaust gas in a first direction through the high pressure exhaust gas recirculation flow channel (29), further comprising where only exhaust gas flows through the high pressure exhaust gas recirculation channel when the engine is not shut-down in a second direction, wherein the second direction is opposite the first direction.

A third example of the method, optionally including one or more of the previous examples, further includes where the engine shut-down is a start/stop.

A fourth example of the method, optionally including one or more of the previous examples, further includes where heating the mixture of fresh air and exhaust gas via an electrical heater.

A fifth example of the method, optionally including one or more of the previous examples, further includes where adjusting a mixing ratio of the mixture of the fresh air and exhaust gas in response to feedback from a lambda sensor arranged upstream or downstream of the NOx storage catalytic converted and a mass air flow sensor.

A sixth example of the method, optionally including one or more of the previous examples, further includes where the regenerating comprises releasing a threshold quantity of nitrogen oxide the NOx storage catalytic converter to an SCR catalyst arranged between the inlet of the low pressure exhaust gas recirculation flow channel.

A seventh example of the method, optionally including one or more of the previous examples, further includes where the threshold quantity of nitrogen oxide released from the NOx storage catalytic converter is detected via a NOx-sensor arranged downstream of the NOx storage catalytic converter, further comprising where urea is injected downstream of the NOx storage catalytic converter and upstream of the SCR catalyst in response to an amount of nitrogen oxide equal to or greater than the threshold quantity being released from the NOx storage catalytic converter.

An embodiment of a system comprises an engine, a turbocharger comprising a compressor configured to be driven via either a turbine or an electric motor, a $NO_x$ trap arranged upstream of a SCR coated PF, a LP-EGR passage fluidly coupled to a portion of an exhaust passage downstream of the SCR coated PF and an exhaust gas valve and a HP-EGR passage fluidly coupled to a portion of the exhaust passage upstream of the turbine, and a controller comprising computer-readable instructions stored on non-transitory memory thereof that when executed enable the controller to activate a regeneration of the $NO_x$ trap in response to an engine shut-down event, wherein a mixture of exhaust gas and air flow through the HP-EGR passage in a first direction and terminate the regeneration in response to the engine shut-down event being terminated, wherein exhaust gas flows through the HP-EGR passage in a second direction, opposite the first direction, when HP-EGR is desired.

A first example of the system further includes where a fuel injector is positioned to inject fuel directly into the exhaust passage at a location between the turbine and the $NO_x$ trap.

A second example of the system, optionally including the first example, further includes where a reductant injector is positioned to inject reductant directly into the exhaust passage at a location between the $NO_x$ trap and the SCR coated PF.

A third example of the system, optionally including one or more of the previous examples, further includes where the instructions further enable the controller to inject reductant via the reductant injector in response to a threshold amount of $NO_x$ being released from the $NO_x$ trap.

A fourth example of the system, optionally including one or more of the previous examples, further includes where the instructions further enable the controller to activate the regeneration of the $NO_x$ trap in response to the engine shut-down event when a load of the $NO_x$ trap is greater than a threshold load and a temperature of the $NO_x$ trap is greater than a regeneration temperature.

A fifth example of the system, optionally including one or more of the previous examples, further includes where the instructions further enable the controller to actuate the exhaust gas valve to a closed position during the regeneration, wherein the instructions further enable the controller to open a LP-EGR valve and a HP-EGR valve during the regeneration.

A sixth example of the system, optionally including one or more of the previous examples, further includes where the LP-EGR passage comprises a LP-EGR cooler and a bypass comprising a bypass valve configured to direct gases around the LP-EGR cooler.

A seventh example of the system, optionally including one or more of the previous examples, further includes where the instructions further enable the controller to actuate the bypass valve to an open position during the regeneration.

An eighth example of the system, optionally including one or more of the previous examples, further includes where the instructions further enable the controller to operate the compressor via the electric motor during the regeneration.

An example of a method comprises flowing a mixture of exhaust gas and air in a first direction through a HP-EGR passage during an engine shut-down event to regenerate a $NO_x$ trap when a $NO_x$ trap load is greater than a threshold load and a $NO_x$ trap temperature is greater than a threshold temperature and flowing exhaust gas in a second direction, opposite the first direction, through the HP-EGR passage when HP-EGR is desired outside of the engine shut-down event.

A first example of the method further includes where injecting fuel via a fuel injector positioned to inject fuel directly into an exhaust passage toward an inlet of the $NO_x$ trap.

A second example of the method, optionally including the first example, further includes where injecting reductant via a reductant injector positioned to inject into an exhaust passage between the $NO_x$ and a SCR coated PF.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for regenerating a $NO_x$ storage catalytic converter of an exhaust gas aftertreatment device of an internal combustion engine arrangement comprising an internal combustion engine, an electrically driven supercharger, a high pressure exhaust gas recirculation flow channel, a low pressure exhaust gas recirculation flow channel with an inlet downstream of the $NO_x$ storage catalytic converter, and an exhaust gas valve arranged downstream of the inlet of the low pressure exhaust gas recirculation flow channel, wherein the regenerating comprises:
detecting a shut-down of the internal combustion engine;
determining a load of the $NO_x$ storage catalytic converter;
determining a current operating temperature of the $NO_x$ storage catalytic converter;
regenerating the $NO_x$ storage catalytic converter in response to the load exceeding a threshold load and the current operating temperature exceeding a threshold temperature, wherein the regenerating comprises a mixture of air and recirculated exhaust gas being conducted via the electrically driven supercharger, wherein the regenerating comprises closing the exhaust gas valve.

2. The method of claim 1, further comprising flowing exhaust gas and fresh air through the low pressure exhaust gas recirculation flow channel, wherein the low pressure exhaust gas recirculation flow channel comprises a low pressure exhaust gas recirculation valve, wherein the low pressure exhaust gas recirculation valve is opened before the regenerating of the $NO_x$ storage catalytic converter, further comprising flowing the fresh air and the exhaust gas through the high pressure exhaust gas recirculation flow channel, wherein the high pressure exhaust gas recirculation flow channel comprises a high pressure exhaust gas recirculation valve, wherein the high pressure exhaust gas recirculation valve is opened before the regeneration of the $NO_x$ storage catalytic converter.

3. The method of claim 2, wherein flowing the mixture of fresh air and exhaust gas in a first direction through the high pressure exhaust gas recirculation flow channel, further comprising where only exhaust gas flows through the high pressure exhaust gas recirculation channel when the engine is not shut-down in a second direction, wherein the second direction is opposite the first direction.

4. The method of claim 1, wherein the engine shut-down is a start/stop.

5. The method of claim 1, further comprising heating the mixture of fresh air and exhaust gas via an electrical heater.

6. The method of claim 1, further comprising adjusting a mixing ratio of the mixture of the fresh air and exhaust gas in response to feedback from a lambda sensor arranged upstream or downstream of the $NO_x$ storage catalytic converted and a mass air flow sensor.

7. The method of claim 1, wherein the regenerating comprises releasing a threshold quantity of nitrogen oxide the $NO_x$ storage catalytic converter to an SCR catalyst arranged between the inlet of the low pressure exhaust gas recirculation flow channel.

8. The method of claim 7, wherein the threshold quantity of nitrogen oxide released from the $NO_x$ storage catalytic converter is detected via a $NO_x$-sensor arranged downstream of the $NO_x$ storage catalytic converter, further comprising where urea is injected downstream of the $NO_x$ storage catalytic converter and upstream of the SCR catalyst in response to an amount of nitrogen oxide equal to or greater than the threshold quantity being released from the $NO_x$ storage catalytic converter.

9. A system, comprising:
an engine;
a turbocharger comprising a compressor configured to be driven via either a turbine or an electric motor;
a $NO_x$ trap arranged upstream of a SCR coated PF;
a LP-EGR passage fluidly coupled to a portion of an exhaust passage downstream of the SCR coated PF and an exhaust gas valve and a HP-EGR passage fluidly coupled to a portion of the exhaust passage upstream of the turbine; and
a controller comprising computer-readable instructions stored on non-transitory memory thereof that when executed enable the controller to:
activate a regeneration of the $NO_x$ trap in response to an engine shut-down event, wherein a mixture of exhaust gas and air flow through the HP-EGR passage in a first direction; and
terminate the regeneration in response to the engine shut-down event being terminated, wherein exhaust gas flows through the HP-EGR passage in a second direction, opposite the first direction, when HP-EGR is desired.

10. The system of claim 9, wherein a fuel injector is positioned to inject fuel directly into the exhaust passage at a location between the turbine and the $NO_x$ trap.

11. The system of claim 9, wherein a reductant injector is positioned to inject reductant directly into the exhaust passage at a location between the $NO_x$ trap and the SCR coated PF.

12. The system of claim 11, wherein the instructions further enable the controller to inject reductant via the reductant injector in response to a threshold amount of $NO_x$ being released from the $NO_x$ trap.

13. The system of claim 9, wherein the instructions further enable the controller to activate the regeneration of the $NO_x$ trap in response to the engine shut-down event when a load of the $NO_x$ trap is greater than a threshold load and a temperature of the $NO_x$ trap is greater than a regeneration temperature.

14. The system of claim 9, wherein the instructions further enable the controller to actuate the exhaust gas valve to a closed position during the regeneration, wherein the instructions further enable the controller to open a LP-EGR valve and a HP-EGR valve during the regeneration.

15. The system of claim 9, wherein the LP-EGR passage comprises a LP-EGR cooler and a bypass comprising a bypass valve configured to direct gases around the LP-EGR cooler.

16. The system of claim 15, wherein the instructions further enable the controller to actuate the bypass valve to an open position during the regeneration.

17. The system of claim 9, wherein the instructions further enable the controller to operate the compressor via the electric motor during the regeneration.

18. An engine system, comprising:
an engine;
a turbocharger comprising a compressor configured to be driven via either a turbine or an electric motor;
a $NO_x$ trap arranged upstream of a SCR coated PF;
a LP-EGR passage fluidly coupled to a portion of an exhaust passage downstream of the SCR coated PF and an exhaust gas valve and a HP-EGR passage fluidly coupled to a portion of the exhaust passage upstream of the turbine; and
a controller comprising computer-readable instructions stored on non-transitory memory thereof that when executed enable the controller to:
activate a regeneration of the $NO_x$ trap via flowing a mixture of exhaust gas and air in a first direction through a HP-EGR passage during an engine shut-down event to regenerate a $NO_x$ trap when a $NO_x$ trap load is greater than a threshold load and a $NO_x$ trap temperature is greater than a threshold temperature; and
terminate the regeneration of the $NO_x$ trap via flowing exhaust gas in a second direction, opposite the first direction, through the HP-EGR passage when HP-EGR is desired outside of the engine shut-down event.

19. The engine system of claim 18, further comprising injecting fuel via a fuel injector positioned to inject fuel directly into the exhaust passage toward an inlet of the $NO_x$ trap.

20. The engine system of claim 18, further comprising injecting reductant via a reductant injector positioned to inject into the exhaust passage between the $NO_x$ and the SCR coated PF.

* * * * *